Feb. 18, 1936.   A. LOMBELLA   2,031,271
HALTER
Filed Feb. 16, 1935
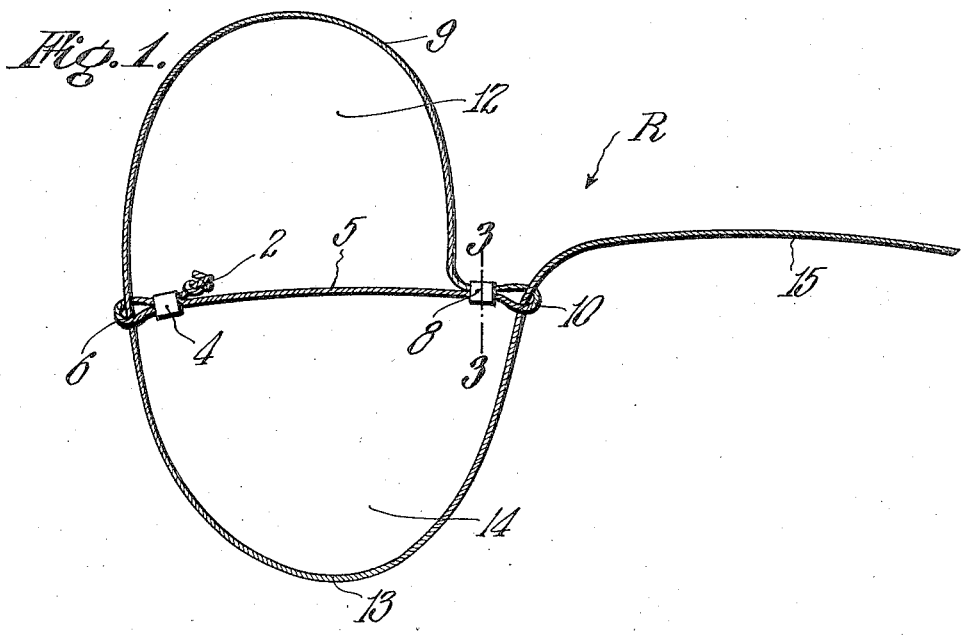
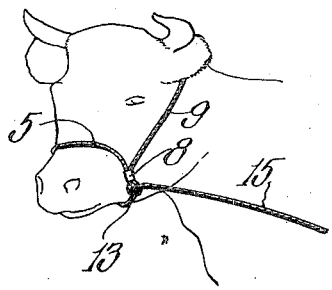
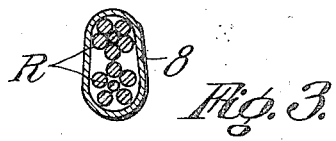
INVENTOR.
August Lombella
BY Walter C. Ross
ATTORNEY.

Patented Feb. 18, 1936

2,031,271

UNITED STATES PATENT OFFICE 2,031,271

HALTER

August Lombella, Westfield, Mass.; John L. Lombella executor of said August Lombella, deceased Application February 16, 1935, Serial No. 6,848

2 Claims. (Cl. 54—24)

This invention relates to improvements in halters and is directed more particularly to the provision of improvements in halters for use in connection with the leading and controlling of cattle and the like.

It is a principal object of the invention to provide a halter which is simple in form so that it is not only economical to manufacture but may be readily slipped about the head of a bull, cow or the like and then manipulated to bring the animal under full control of the handler.

As a further object, the halter of this invention is provided with a plurality of loops of variable sizes for fitting animals of various sizes. By tightening the halter, the animal, regardless of his size, may be quickly and easily controlled by the cattleman.

Another distinctive feature of this invention is the strong yet flexible manner in which the halter is constructed. As will appear, my halter is formed of a single piece of rope doubled upon itself in a novel manner and provided with relatively rigid clasps which, while serving a more or less shape-giving function to the rope, are so arranged that the halter may be made to accommodate animals of various sizes.

Various other objects and advantages of the invention will be more readily apparent after a reading of the following description which is taken in connection with the accompanying drawing, wherein:

Fig. 1 is an elevational view of the halter of the invention;

Fig. 2 is a perspective view showing the halter of Fig. 1 disposed on an animal's head; and Fig. 3 is a cross sectional view on the line 3—3 of Fig. 1.

Referring now to the drawing in detail, the invention will be more fully described.

A single length of rope R has a knot 2 at one end. This end portion is then doubled back upon itself as shown in Fig. 1 and a clasp or clip 4 frictionally embraces the doubled portions to form an outer eye 6.

The rope R is also doubled back upon itself at a distance inwardly from the said end and another clip 8 is provided to frictionally embrace these doubled portions as shown. In this way, a second or inner eye 10 is formed spaced from the first eye 6 and a cross portion 5 is provided for extending over the nose of an animal.

The clips 4 and 8 are preferably similar in construction and will be later described more in detail, it being sufficient at present to state that it is desirable that they be formed of some strong and relatively rigid material, such as brass or the like.

The portion 9 of the rope R which extends away from the second eye 10 extends upwardly and then downwardly to pass through the first eye 6 as shown. In this way there is provided an upper loop 12 which is adapted to extend over or on top of the head of the animal, as shown in Fig. 2.

The portion 13 of the rope extending from the portion 9 then proceeds downwardly and again upwardly to pass through the second eye. This forms a lower loop 14 for extending beneath the head or adjacent the throat of the animal as clearly shown in Fig. 2.

The portion of the rope R leading from the part 13 extends away from the eye 10 to provide a free end portion 15 which is adapted to be held by the handler. It will be quickly seen that by pulling on this portion 15 the sizes of the loops 12 and 14 may be readily decreased. Thus, the loops may be tightened about the animal so that it is compelled to submit to the handler.

As stated above, the clasps 4 and 8 are arranged to frictionally embrace the doubled portions of the rope. For a reason which will presently appear, according to the preferred form of the invention, these clips are arranged to embrace one of the doubled portions more snugly than the other.

That is to say, the clasps 4 and 8 are formed to permit the doubled eye-forming portions to be moved relative to one another. For example, as shown in Fig. 3, the clasp such as 8, may be slightly tapered to have one side smaller than the opposite side. In this way the portion forming one side of the eye may be more tightly embraced than the portion of the rope forming the opposite side of the eye. Thus when the free end of the rope is pulled by the handler, one side of the eye is moved relative to both the clasp and the other side of the eye so that the size of the eye is reduced.

It is obvious that this reduction in the size of the eye causes the eye to bite upon the portion of the rope which extends therethrough. In this way, a strong grasp of the animal is obtained and the straining of the animal against the halter results in a more firm grip. It will also be noted that the sizes of the eyes are not fixed as contrasted with ordinary halters.

Since the rope is slidable relative to the clasps, my halter is distinctive in that the length of the cross portion 5 may be varied at will. In this way, my halter is adapted to accommodate cattle of various sizes, as contrasted with the present-day practice of providing halters having bands of definite invariable lengths. It is an economical and convenient advantage of this invention that the same halter may be used in connection with the largest, most vicious bull just as efficiently as with the smallest, meekest calf.

When it is desired to place the halter on the animal, the handler disposes the cross member 5 over the nose of the animal as shown in Fig. 2 and adjusts the clasps so that they lie adjacent opposite sides of the head. The rope is moved relative to the clasps so that the length of the portion 5 accommodates the size of the head of the animal.

Then the upper loop 12 is placed over the head and the lower loop under the chin. When the free end portion 15 is pulled, the portions 9 and 13 are drawn through the eyes so that the loops securely bind the animal.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A halter of the class described comprising in combination, a single length of rope having a knot on its one end doubled upon itself adjacent said end and at a distance from said end to provide first and second eye portions with a free end extending from said second eye portion, relatively elongated metal clasps frictionally embracing the doubled rope parts forming the eye portions and co-operating therewith to form constrictable eyes, the rope which extends between said eye portions providing a cross portion adapted for extending over the nose of an animal and the free end portion of the rope adjacent the second eye portion extending upwardly and downwardly through the first-named eye, and then downwardly and upwardly through the second-named eye, forming upper and lower loop portions for extending over the head and under the throat of an animal respectively, all constructed and arranged whereby the free end of the rope may be pulled so as to slide said rope through the clasps to vary the lengths of said cross and loop portions and whereby the pulling of the free end of the rope constricts said eyes and causes them to bite upon the portions of the rope passing therethrough.

2. A halter of the class described comprising in combination, a single length of rope having a knot on its one end doubled upon itself adjacent said end and at a distance from said end to provide first and second eye portions with a free end extending from said second eye portion, relatively elongated metal clasps frictionally embracing the doubled rope parts forming the eye portions and co-operating therewith to form constrictable eyes, the rope which extends between said eye portions providing a cross portion adapted for extending over the nose of an animal and the free end portion of the rope adjacent the second eye portion extending upwardly and downwardly through the first-named eye, and then downwardly and upwardly through the second-named eye, forming upper and lower loop portions for extending over the head and under the throat of an animal respectively, the said clasps being formed so as to embrace one of the doubled rope parts forming the eye portions more snugly than it embraces the other, all constructed and arranged whereby the free end of the rope may be pulled so as to slide said rope through the clasps to vary the lengths of said cross and loop portions and whereby the pulling of the free end of the rope constricts said eyes and causes them to bite upon the portions of the rope passing therethrough.

AUGUST LOMBELLA.